E. HAVENS.
AUTOMOBILE CLUTCH CONTROL.
APPLICATION FILED SEPT. 6, 1910.
980,777.
Patented Jan. 3, 1911.
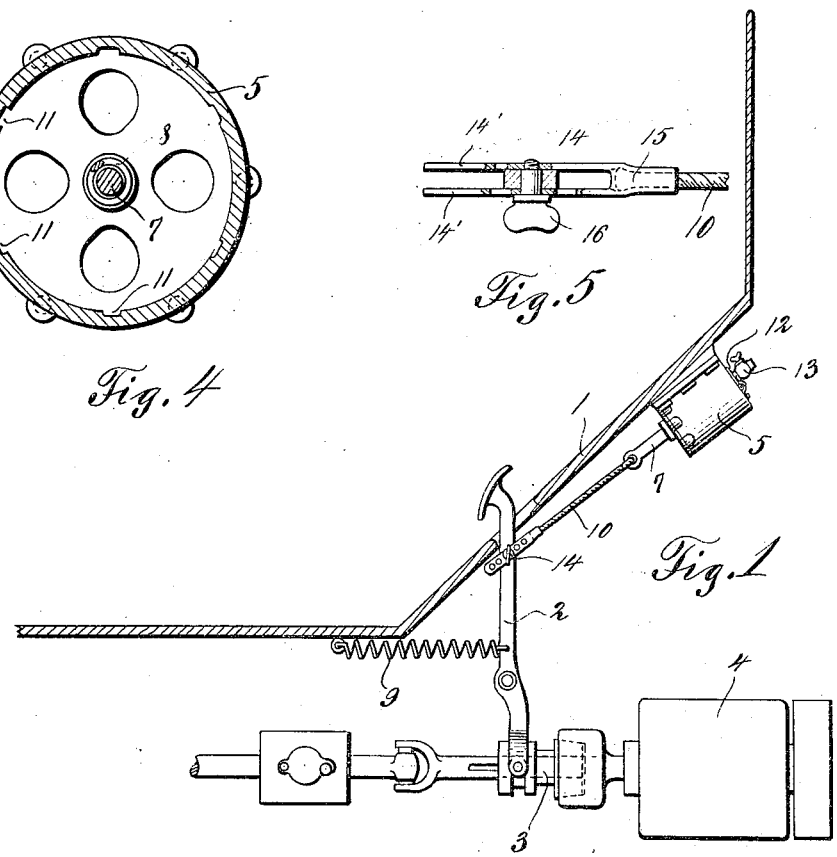

UNITED STATES PATENT OFFICE.

ERNEST HAVENS, OF SUMMIT, NEW YORK.

AUTOMOBILE CLUTCH-CONTROL.

980,777. Specification of Letters Patent. Patented Jan. 3, 1911.

Application filed September 6, 1910. Serial No. 580,588.

*To all whom it may concern:*

Be it known that I, ERNEST HAVENS, a citizen of the United States, residing at Summit, in the county of Schoharie and State of New York, have invented certain new and useful Improvements in Automobile Clutch-Controls, of which the following is a specification.

As is well known in the operation of automobile controls, a clutch pedal is ordinarily employed, the same being subjected to a pressure in order to throw the clutch "out" in stopping the machine. Where operators are not expert, or careless, the pressure on the clutch pedal is sometimes relieved too suddenly, throwing the clutch "in" so quickly as to subject the rear axle of the machine to undue strain, and sometimes causing the gears of the transmission to be stripped.

The present invention consists of a simple attachment for automobiles for connection with the clutch pedal to prevent the "slamming in" of a clutch with resultant series effects.

For a full understanding of the invention, reference is to be had to the following detail description and the accompanying drawings, in which—

Figure 1 is a partial sectional view showing the front end of an automobile body, and illustrating the invention connected operatively with the clutch pedal; Fig. 2 is a sectional view of the cylinder attachment which is connected with the clutch pedal; Fig. 3 is an end view of said cylinder; Fig. 4 is a section on the line 4—4 of Fig. 2; Fig. 5 is a detail view showing the preferred specific connection between the piston of the retarding cylinder and the clutch pedal.

Throughout the following detail description and on the several figures of the drawings, similar parts are referred to by like reference characters.

In the drawings, 1 denotes the foot board of an automobile, 2 the clutch pedal pivotally supported on the machine in any ordinary manner, and 3 the clutch operated by said pedal 2.

4 is the motor.

Applied to the under side of the foot board 1 is the cylinder attachment which comprises the cylinder 5 in which operates a suitable piston 6, and the piston is normally held at the upper end of the cylinder 5 by a coiled spring 8 disposed around the rod 7. A spring 9 is connected with the foot pedal 2 and normally tends to force said pedal rearwardly with respect to the foot board 1 when pressure thereon is relieved, said spring in other words normally tending to actuate the foot pedal to throw the clutch 3 "in".

Under normal conditions, pressure being exerted on the pedal 2, the spring 9 is extended and the piston 6 is arranged near the upper end of the cylinder 5. Should the operator suddenly release the pedal 2, the spring 9 under ordinary conditions would tend to move the pedal, suddenly "slamming in" the clutch 3. The piston 6 in the use of the present invention, however, is connected by a flexible member 10 with the upper portion of the pedal 2 and so if the operator released the pedal suddenly, the rearward movement of the upper end exerts a downward pull on the piston 6. The piston 6 moves slowly at first until it begins to clear the longitudinal recesses 11 on the inner walls of the cylinder, whereupon the movement of the piston is accelerated. The retarding device afforded by the piston 6 and its peculiar connections with the pedal 2, prevents sudden throwing "in" of the clutch 3, only permitting the slow movement of the pedal at the start, and which movement increases or is accelerated as the clutch moves into more active contact. When the pressure is again placed on the pedal 2 to release the clutch 3, the tension on the connection 10 is removed and the spring 8 in the cylinder 5 forces the piston 6 toward the upper end of the cylinder again, and a flat valve 12 permitting quick escape of the air drawn into the cylinder through the regulating inlet valve 13. By adjusting the valve 13, and also adjusting the connection at 14, the clutch may be regulated so as to take hold correctly and easily to suit the preference of the operator. The connection 14 consists of a socket 15 from which extends spaced plates 14′ receiving the pedal 2 therebetween, a suitable screw 16 being employed for adjustment, and adapted to pass through the sets of openings in the spaced parts 14′. The spring 8 coacting with the piston thus exerts a force antagonistic to but less than the force of the spring 9, the latter being capable of returning the pedal 2 to its clutch operative position under ordinary conditions of service.

It will be understood that the term "operating pedal" as applied to the part 2 herein contemplates an operating device of any general type equivalent to the pedal illustrated in the drawing.

Having thus described the invention, what is claimed as new is:

In an automobile clutch control, the combination with a support, an operating pedal pivoted between its ends, a clutch connected with the lower end of said pedal, a spring connected with the pedal above its pivot to normally hold the pedal in a position in which the clutch is operated, and a retarding device coacting with the pedal consisting of a cylinder secured to the support, a piston mounted in said cylinder, a plate adjustably secured to the pedal near its upper end, a flexible connection between said plate and the piston rod, a spring in the cylinder and normally bearing against the piston with a force antagonistic to but less than that of the first mentioned spring, and valve mechanism for the cylinder controlling the admission and outlet of air with respect thereto.

In testimony whereof I affix my signature in presence of two witnesses.

ERNEST HAVENS.

Witnesses:
CHAUNCEY J. WHARTON,
EVERETT G. BRAZIL.